March 31, 1964   G. H. SHARP ETAL   3,127,514
COLLIMATOR FOR HIGH ENERGY RADIATION BEAMS
Filed Feb. 6, 1961   6 Sheets-Sheet 1

March 31, 1964  G. H. SHARP ETAL  3,127,514
COLLIMATOR FOR HIGH ENERGY RADIATION BEAMS
Filed Feb. 6, 1961  6 Sheets-Sheet 2

Inventors
George Harold Sharp
André Frenette
Frederick William Taggart
By Cushman, Darby & Cushman
Attorneys March 31, 1964   G. H. SHARP ETAL   3,127,514
COLLIMATOR FOR HIGH ENERGY RADIATION BEAMS
Filed Feb. 6, 1961   6 Sheets-Sheet 3

Inventors
George Harold Sharp
André Frenette
Frederick William Taggart
By Cushman, Darby & Cushman
Attorneys

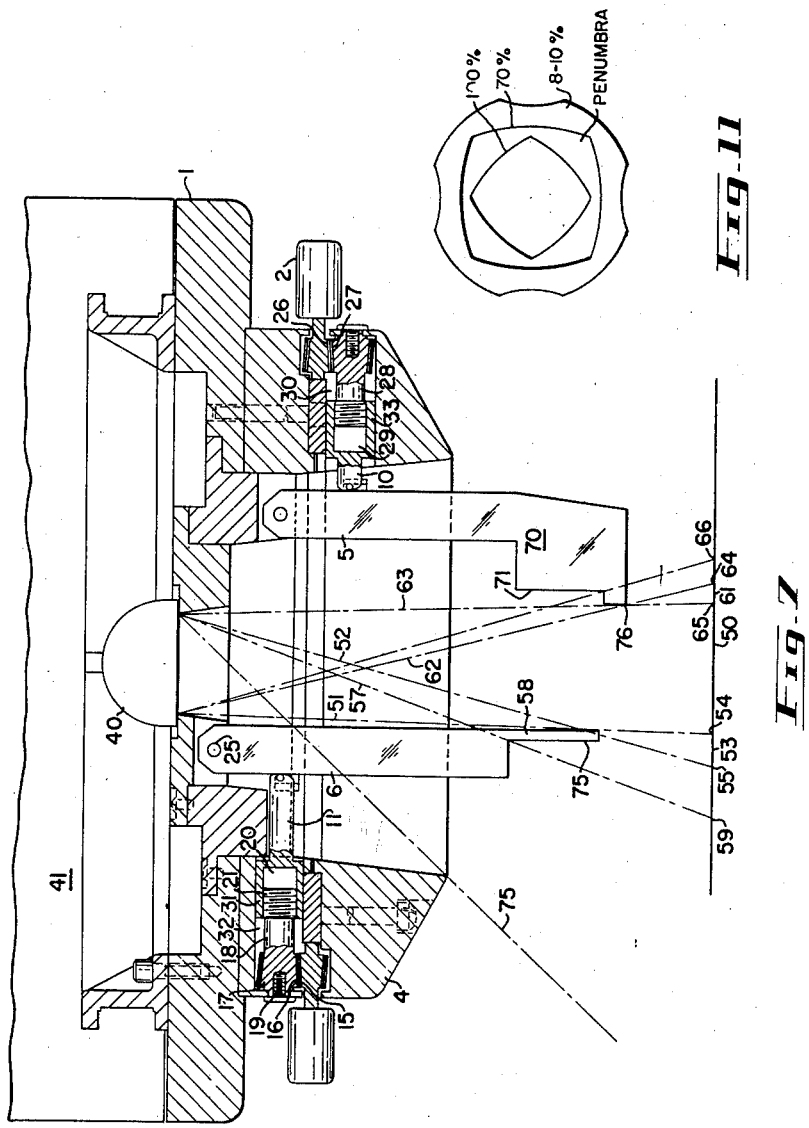

March 31, 1964        G. H. SHARP ETAL        3,127,514
COLLIMATOR FOR HIGH ENERGY RADIATION BEAMS
Filed Feb. 6, 1961                                6 Sheets-Sheet 6

Inventors
George Harold Sharp
André Frenette
Frederick William Taggart
By Cushman, Darby & Cushman
Attorneys

United States Patent Office 3,127,514
Patented Mar. 31, 1964

3,127,514
COLLIMATOR FOR HIGH ENERGY
RADIATION BEAMS
George Harold Sharp, Mount Royal, Quebec, Andre Frenette, Laval des Rapides, Quebec, and Frederick William Taggart, Pointe Claire, Quebec, Canada, assignors to Aviation Electric Limited, Montreal, Quebec, Canada, a body corporate and politic
Filed Feb. 6, 1961, Ser. No. 87,230
Claims priority, application Canada Feb. 8, 1960
5 Claims. (Cl. 250—105)

The present invention relates to a collimator for high energy radiation beams and finds particular use in radiation treatment of living tissue.

At the present time, the most usual apparatus for collimating beams of this type especially for sources such as the cobalt "bomb" and X-ray machines, comprises a series of blocks of lead or heavy metal (a particularly dense alloy developed for the arresting of gamma ray and high energy particle radiation), each having a conical shaped hole in it and in which the cone angle increases in going from one block to the next in the series. Each cone is capable of being attached to the source so as to define the solid angle through which rays from the source may freely pass. For any particular treatment, that cone is chosen whose angle is such that the area of rays intercepted by the tissue to be treated, is correct at the distance from source to tissue desired. The walls of the cone are made thick enough to ensure that there is little or no radiation except within the solid angle generated by the cone. Schemes have also been proposed resembling the adjustable iris diaphragm used in a camera, but these are in general fairly complex mechanically and tend not to produce a consistently good radiation pattern at all settings of the diaphragm.

In the present invention, there is provided a collimator for high energy radiation beams, which is not only adjustable but which is simple mechanically and can comfortably give the variation in solid angle required in this art without undue distortion of the beam pattern on the target.

More particularly, according to the present invention, there is provided, for high energy beams, wherein the quanta comprising the beam travel as rays in straight lines from a source, a collimator which comprises, an inner and an outer ring of leaves of quantum absorbing material, each ring comprising at least three leaves extending in a direction away from the source to define a solid angle at the source, means for adjusting the inclination to said general direction of each leaf of the inner and outer rings and means mounting the outer ring of leaves whereby the gap between any two leaves of the inner ring is covered by a leaf in the outer ring for absorbing quanta passing through said gap.

In the description of a preferred embodiment of the invention which follows, reference will be made to the accompanying drawings in which:

FIGURE 7 shows a side view sectioned along the line 7—7 of FIGURE 3;

FIGURE 11 shows a pattern as in FIGURE 10 for the device in the open position.

Figure 1:
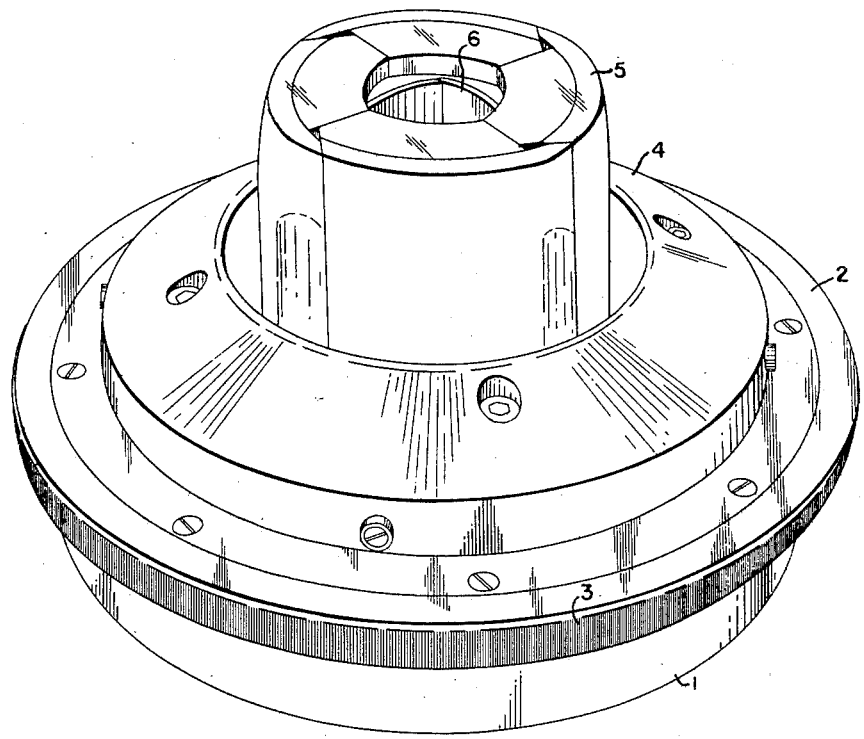
FIGURE 1 shows a side view of a device illustrating an embodiment of the invention in the closed or smallest solid angle position.
Figure 2:
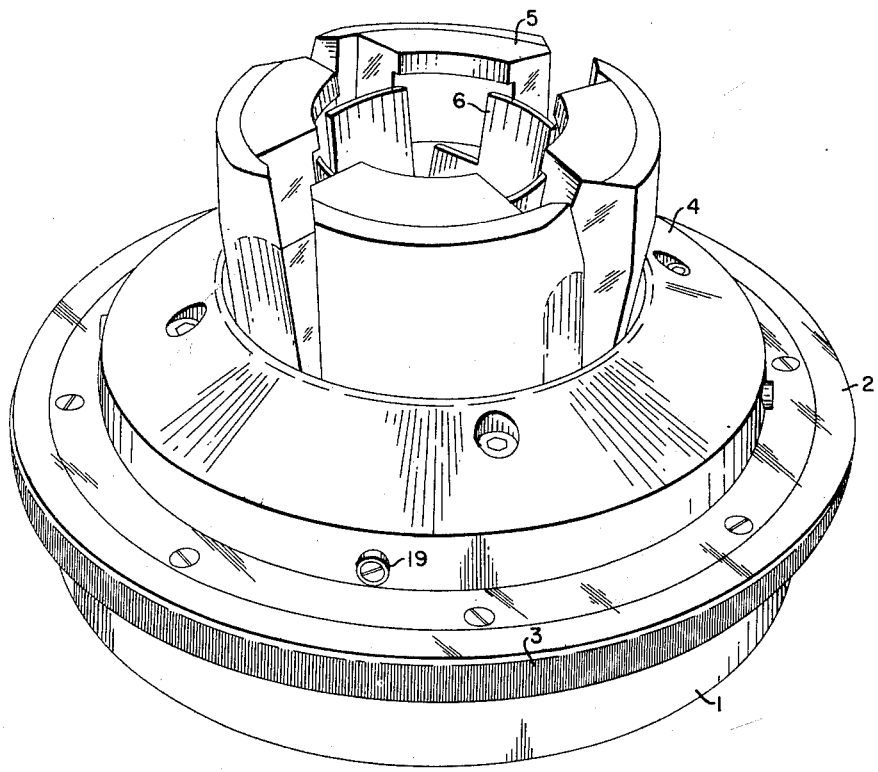
FIGURE 2 shows a view from the same point of vantage, of the device of FIGURE 1 in the open or largest solid angle position.
Figure 3:
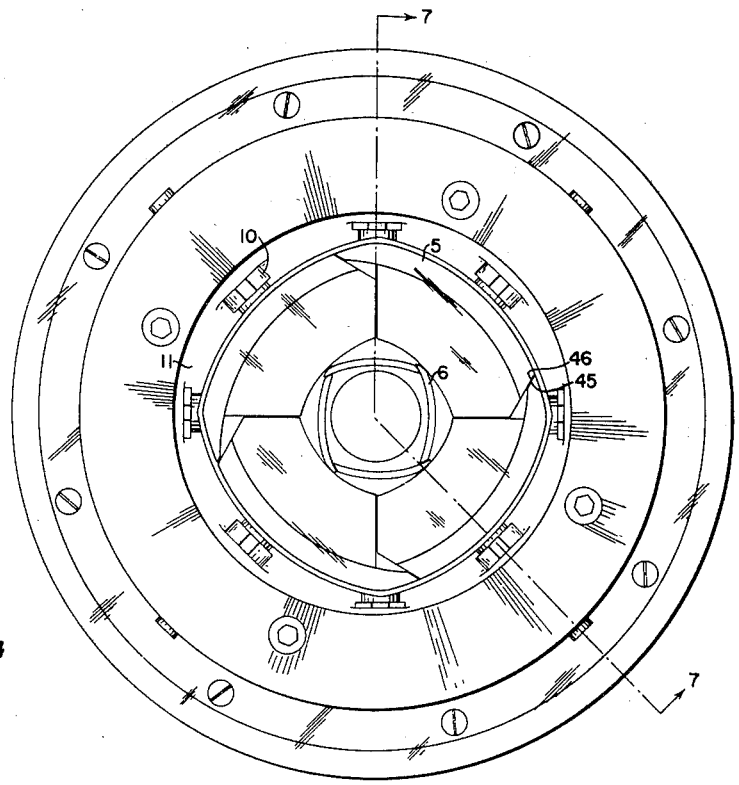
FIGURE 3 shows a plan view of the device in the position of FIGURE 1.
Figure 4:
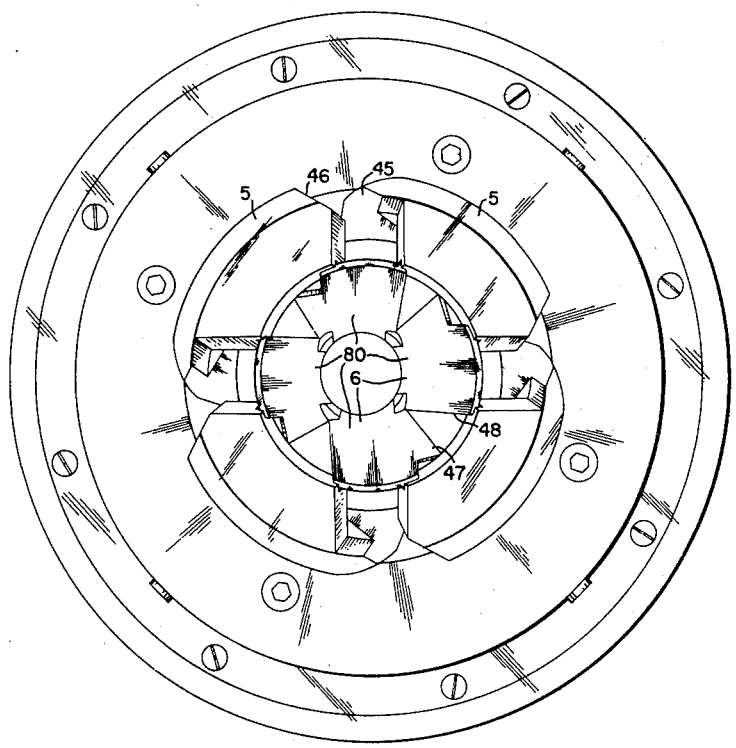
FIGURE 4 shows the device in the position of FIGURE 2 again in plan view.

Now making reference first to FIGURES 1 and 2, the device comprises a base 1 and adjusting ring 2 with milled edge 3, a guard ring 4, outer ring of leaves 5 and inner ring of leaves 6. Adjustment from the closed to the open position is obtained by rotating ring 2 with respect to base 1 about the axis perpendicular to the plane of ring 2. In FIGURES 3 and 4, the connecting levers between the mechanism operated by ring 2 can be seen at 10 for outer leaves 5. A similar linkage (not shown) for inner leaves 6 is also provided. These will now be described in detail.

The detailed structure and method of operation of the leaf mechanism can be seen by reference to FIGURE 7. Rotation of the ring 2 causes the rack teeth 15 formed on it to rotate the bevel gear 17 by engagement with teeth 16 on a shaft 18. The shaft is located at one end by a projecting shank 19 (also shown in FIGURE 2) and it is supported at the other end in a threaded hole 20 of a housing 31 by means of its threaded end 21. Housing 31 is located in hole 32 rectangular in cross section within guard ring 4. As the ring 2 is rotated end 21 screws into or out of hole 20 thereby moving lever 11 and causing leaf 6 to swing about its hinge pivot 25. The mechanism for the operation of leaves 5 is exactly similar and is accomplished by the engagement of rack 26 with bevel gear 27 which screws shaft 28 into threaded hole 29 in a housing 33 forming part of lever arm 10. The housing 33 is carried in rectangular hole 30 formed in the metal of guard ring 4.

Figure 8:
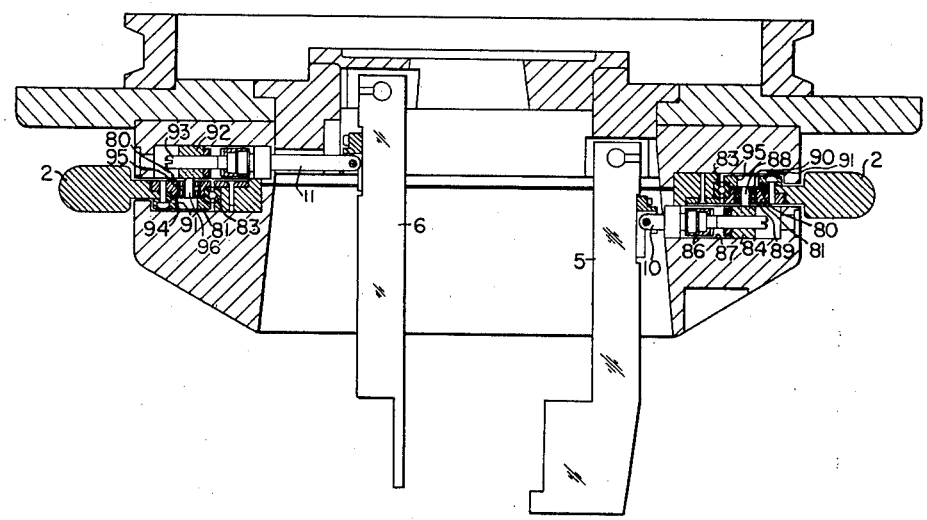
FIGURE 8 shows a side view sectioned along line 7—7 of FIGURE 3 of an alternative embodiment.

An alternative embodiment to the leaf operating mechanism can be seen in FIGURE 8, showing again a section on line 7—7 of FIGURE 3.

Figure 9:
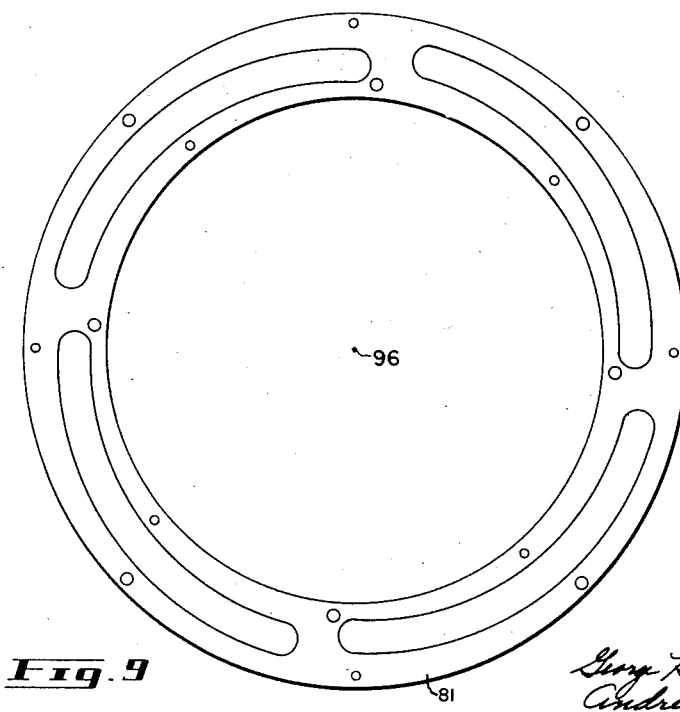
FIGURE 9 shows a plan view of one of the cam members in the embodiment of FIGURE 8.

Two upper and lower cams 80 and 81 are clamped to ring 2, and are free to rotate as a unit on bearing 83. Each leaf 5 and 6 is again adjusted in inclination by levers 10 and 11 respectively. Lever 10 is connected to block 84 in hole 87 (both of which are rectangular in section, viewed in the direction of the longitudinal axis of hole 87) by adjusting screw 85. A socket 86 which like block 84 is also free to slide longitudinally in hole 87 receives screw 85 so that this screw may be rotated for adjustment of leaf 10 with respect to the block. A shaft 88 protrudes from block 84 and fits into ball bearing race 89. The outer portion 90 of the bearing 89 is received in slot 91 of lower cam 81. As can be seen in FIGURE 9, for cam 81, there is a slot 91 for each of the four leaves 5. Each slot is offset so that it is inclined to the circumference of a circle struck about centre 96. Upon rotation of ring 2 therefore, block 84 is urged inwards or outwards depending on the sense of rotation and the angle of inclination of leaf 5 is thereby altered.

The mechanism for adjusting the inclination of leaves 6 is similar to that for leaves 5, and includes block 92 adjusting screw 93 and bearing 94 riding in slot 95 of cam 80. Bearing 94 carries a shaft 96 for coupling to the block 92. The cam 80 is similar in construction to cam 81 of FIGURE 9.

When the device is to be put to use, a radio-active source 40 is placed within the shielded housing 41. This housing 41 is so constructed according to conventional practice to ensure that there is little or no radiation in any direction except that to be controlled by the collimator.

Figure 6:
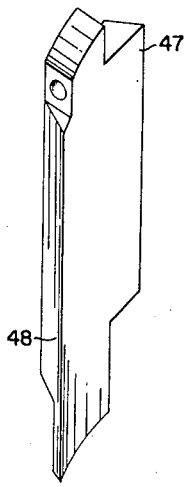
FIGURES 5 and 6 show general three-dimensional views of the large and small leaf of which the present invention makes use.
Figure 5:
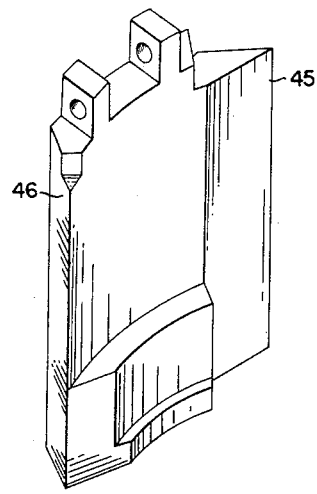

It can be seen from FIGURE 7 and again in FIGURE 3 that a ray from source 40 in or close to the plane of the section 7—7 will encounter only one leaf 5 or 6 when the device is in the open position because it passes through the gap between the abutting surfaces of two adjacent leaves in one ring. In all other directions, except where any two leaves abut, a ray will pass through at least part of both leaves before it can emerge beyond the outer ring of leaves 5 and external radiation from these rays is thus at a low value. It can be seen that, by shaping the leaves at their edges so that they overlap, it is only when the device is in its more open positions that a ray actually avoids one ring of leaves entirely. The overlapping portions 45 and 46 of outer ring 5 and portions 47 and 48 for inner ring 6 are shown in FIGURES 4, 5 and 6.

Let us now consider several rays in the plane of the section of FIGURE 7. Assume that 50 represents in section, a target area for the rays from source 40. Between rays 51 and 52 from opposite extremes of the source there is a penumbral region 53 on target 50. If the relative intensity at point 54, that of interception of ray 51 with target 50, is taken to be 100 percent, then the intensity at point 55, that of interception of ray 52 with target 50, is about 70 percent. Ray 57 is that at the greatest angle to the axis of the collimation zone which passes through the thin tongue 58 of leaf 6. This ray intercepts target 50 at point 59. The intensity at point 59 is about 8 to 10 percent. For the leaf 5 the area 61 between rays 62 and 63 is penumbral so that the intensity at point 64 is about 70 percent of that at point 65 and the intensity at point 66 is again about 8 to 10 percent. It will be apparent, therefore, that the section of FIGURE 7 indicates the worst conditions that are likely to occur outside the area of 100 percent radiation. At all places where the leaves 5 and 6 overlap, the intensity falls rapidly to a low value at points outside the penumbral region and in the open position where overlapping of the two leaves is not present it has been found possible by including the extension piece 70 on leaf 5 and the tongue 58 on leaf 6 to control the pattern in a very satisfactory manner. The relieved surface 71 of extension 70 is to provide accommodation for the tongue 58 of that leaf 6 adjacent to the leaf 5 shown. It has been found that if more material is cut from face 71 (allowing for the thickening of tongue 58) the region between points 55 and 59 receives less intense radiation, but radiation between point 64 and 66 is considerably increased. To some extent, these thicknesses can be varied, but one for tongue 50 of about 15% to 20% of the width of leaf 6 has been found to be very satisfactory. From rays at large angles to the general direction of extension of the leaves, such as shown by ray 75, the intensity of external radiation starts to increase. This is, particularly where leaves 6 and 5 do not overlap, because the thickness of material through which the ray passes before emerging from the collimator leaves, is not sufficient for maintaining a low value of radiation from these rays. Guard ring 4 is thus introduced and provides an increase in the thickness of metal through which any such ray must travel.

Figure 10:
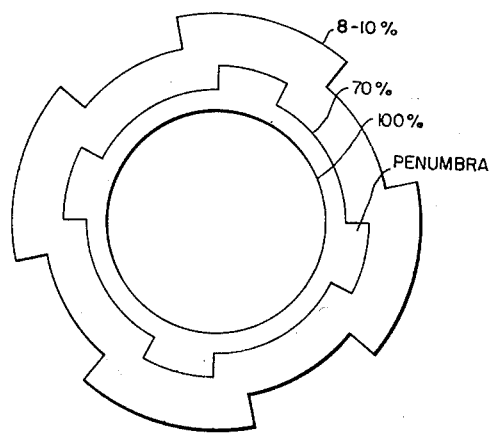
FIGURE 10 shows a typical radiation pattern for the device in the closed position.

A typical expected radiation pattern produced on a target 50 by this device is shown at FIGURE 10 for the closed position and FIGURE 11 for the open position. It is desirable in order to minimize the penumbral area to make the collimator so that tips 75 and 76 of leaves 5 and 6 as far as possible away from source 40. The distance at which these can be placed in any particular instance will be dictated by the practical size of the device.

To improve the performance of the collimator, the inner surfaces 80 of leaves 6 are plated with chromium or copper to minimize the production of high intensity electrons by the impinging radiation from source 40. Skin burns on the tissue being irradiated, can be produced by such electrons.

It is clear that source 40 may be replaced by the target of an X-ray tube if the use of the collimator is so contemplated.

We claim:

1. For high energy beams wherein the quanta comprising the beam travel as rays in straight lines from a source, a collimator which comprises, an inner and an outer ring of longitudinally extending leaves of quantum absorbing material, each ring comprising at least three leaves extending in a general direction away from the source to define a solid angle at the source each leaf thereby being inclined to the direction of rays from said source so that quanta to be absorbed by said leaves intercept said leaves at small angles to the direction of longitudinal extension of said leaves and a depth of absorption material effectively greater than the thickness of each said leaf is presented to said quanta, means for adjusting the inclination to said general direction of each leaf of the inner and outer rings and means mounting the outer ring of leaves whereby a gap between any two leaves of the inner ring is covered by a leaf in the outer ring for absorbing quanta passing through said gap.

2. A collimator as defined in claim 1, wherein each leaf of the outer ring has an extension piece provided on the end remote from the source extending transversely to the leaf and into the space defined by the solid angle for that ring.

3. The collimator as defined in claim 2, wherein each leaf of the inner ring has a tongue provided at its end remote from the source extending in the direction away from the source.

4. The collimator as defined in claim 3 wherein each extension piece is relieved to accommodate the tongues adjacent to it.

5. The collimator as defined in claim 4, having a guard ring mounted beyond the outer ring for intercepting rays from said source passing through the leaves at large angles to the general direction of extension of the leaves.

References Cited in the file of this patent
UNITED STATES PATENTS

| | | |
|---|---|---|
| 1,277,089 | Littlefield | Aug. 27, 1918 |
| 2,094,103 | Horsley | Sept. 28, 1937 |
| 2,295,975 | Storm | Sept. 15, 1942 |
| 2,331,586 | Waisco | Oct. 12, 1943 |
| 2,677,069 | Bachman | Apr. 27, 1954 |